March 29, 1960   W. C. YURGARTIS   2,930,978
PHASE ANGLE MEASURING APPARATUS
Filed Dec. 26, 1957
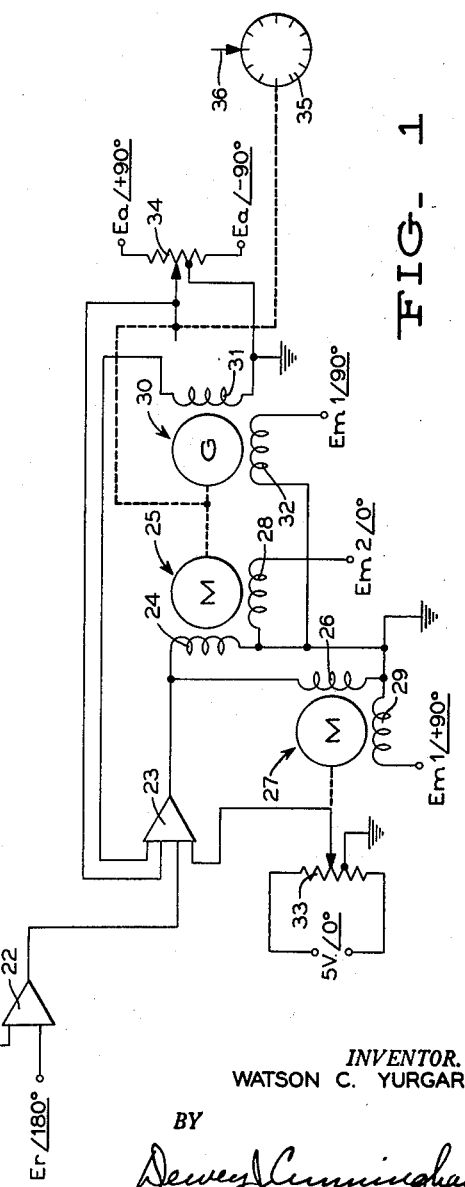
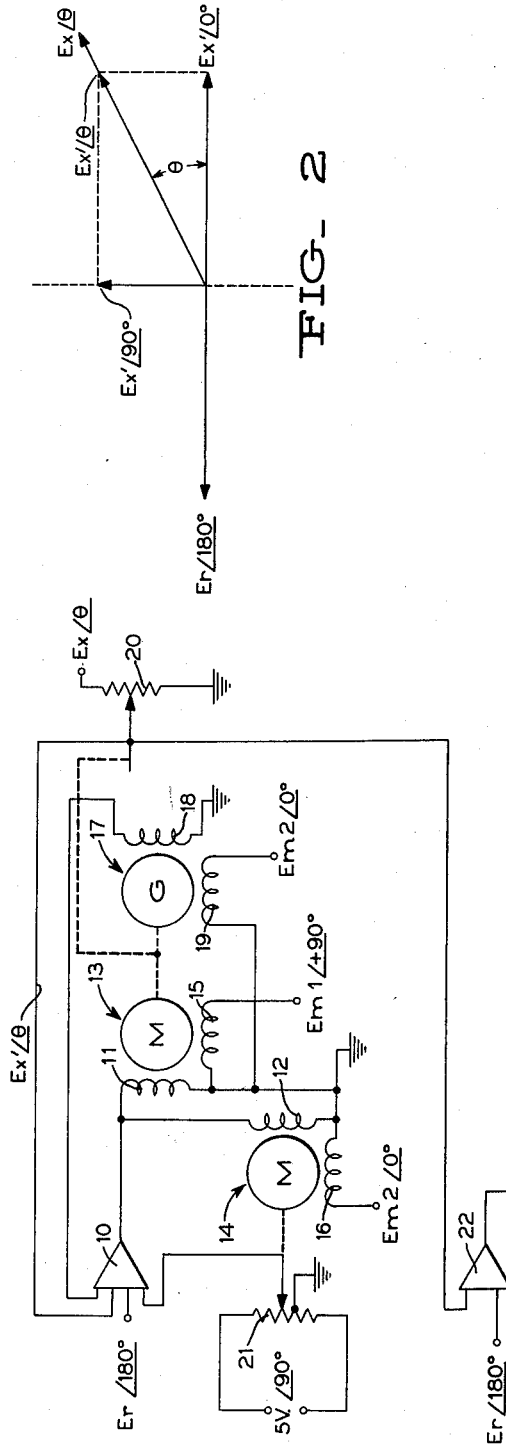
*INVENTOR.*
WATSON C. YURGARTIS
BY
Dewey J Cunningham
ATTORNEY.

United States Patent Office 2,930,978
Patented Mar. 29, 1960

2,930,978
PHASE ANGLE MEASURING APPARATUS

Watson C. Yurgartis, Endicott, N.Y., assignor to International Business Machines Corporation, New York, N.Y., a corporation of New York Application December 26, 1957, Serial No. 705,458

5 Claims. (Cl. 324—83)

The present invention relates to a phase comparing or measuring apparatus and is particularly useful for detecting the phase relationship between two voltages of the same frequency.

Various devices have been proposed in the past for comparing the phase relationship of two signals and for some applications have proven satisfactory. However, for certain purposes such as, for example, the determination of the change in phase of an A.C. signal in computer apparatus where a wide range of signal amplitudes is found, difficulty has been encountered in providing a simple means for indicating the phase angle of such signals with a high degree of accuracy.

The principal object of this invention is to provide a new and improved phase angle measuring apparatus.

Another object of the invention is to furnish an improved apparatus for comparing the phase relationship between two signals of the same frequency.

A further object of the invention is to provide an improved apparatus for detecting the phase relationship between a reference voltage of known magnitude and phase angle and an unknown voltage whose magnitude and phase angle may vary over relatively wide ranges.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a schematic diagram of the present invention; and

Fig. 2 is a vector diagram for a particular phase angle relationship between two signals of the same frequency.

Any voltage vector can be resolved into inphase (real part) and quadrature phase (reactive part) components. In the present invention, a portion of the unknown voltage is selected having an inphase component which is equal in magnitude but displaced 180° in phase from the inphase or 0° component of a reference voltage. This selected portion of the unknown voltage is summed with the reference voltage leaving only the quadrature phase component of the selected portion of the unknown voltage. This quadrature phase voltage is fed to a servo mechanism for positioning a shaft to an angular position proportional to the magnitude of the last-mentioned quadrature phase component. The angular position of the shaft will also be indicative of the phase angle between the unknown voltage and the reference voltage. This is true even though the unknown voltage varies over a relatively wide range in magnitude.

For a more detailed description of the present invention, reference is made to Fig. 1. Summing amplifier 10, motor 13, generator 17 and potentiometer 20 comprise a positional servo for the purpose of automatically selecting a predetermined portion of the unknown voltage $Ex \angle \theta$ which excites potentiometer 20. The selection of the predetermined portion is accomplished by supplying a voltage $Er \angle 180°$ as an input to amplifier 10. This voltage has a predetermined amplitude and, as indicated, has a 180° phase relationship with respect to the 0° reference phase of this same voltage. In the description which follows, the specific phase angle indicated with a particular voltage will be understood to mean with respect to the 0° reference phase of the reference voltage $Er$. The fixed field winding of motor 13, which is excited with $Em1 \angle +90°$, in conjunction with the output voltage from summing amplifier 10, which appears across the input winding 11, causes motor 13 to drive the rotor of generator 17 which is mechanically coupled therewith. The generator is provided with a fixed field winding 19, which is excited by the voltage $Em2 \angle 0°$, and an output winding 18. The voltage across the rotor winding 18 is proportional to the rate of rotation of the rotor and serves as a feedback input to amplifier 10 for damping purposes.

The slider of potentiometer 20 is also mechanically coupled to motor 13 by way of suitable gearing so that it is positioned in accordance with the rotation thereof. The voltage appearing on the slider of potentiometer 20 is connected as a second input to amplifier 10. It will be apparent that the motor 13 will continue to drive until the component of the slider output voltage of potentiometer 20 which is in phase with the reference voltage $Er \angle 0°$ is equal in magnitude to the first-mentioned input voltage $Er \angle 180°$ to summing amplifier 10. When this null is reached, the motor will stop driving and the voltage appearing on the slider of potentiometer 20 will be $Ex' \angle \theta$, which consists of components $Ex' \angle 0°$ and $Ex' \angle 90°$.

Motor 14 and potentiometer 21 comprise a secondary position servo for the purpose of nulling out any components of input voltage to amplifier 10 which are ±90° out of phase with the input reference voltage $Er \angle 0°$. This secondary position servo, which may be termed a quadrature rejector, prevents voltage saturation of amplifier 10 from occurring due to quadrature voltage near the null condition of the primary position servo. This is accomplished by also supplying the output of amplifier 10 to control winding 12 of motor 14. The fixed excitation winding 16 of this motor is supplied with a voltage $Em2 \angle 0°$. This voltage is, of course, in phase with the reference voltage $Er \angle 0°$. Since motor 14, like motor 13, is a two phase motor, torque will be developed, and motor 14 will drive only when a voltage component of the output from amplifier 10 which is 90° out of phase with the reference voltage $Em2 \angle 0°$.

The output shaft of motor 14 is mechanically coupled to the slider of potentiometer 21. The center tap to potentiometer 21 is grounded. The opposite ends of the potentiometer are excited with the voltage which is 90° out of phase with the reference voltage $Er$. The output voltage from the slider of potentiometer 21 is connected as a third input to amplifier 10.

The circuit described at this point is capable of selecting a portion $Ex' \angle \theta$ of the unknown voltage $Ex \angle \theta$. The former voltage has an inphase component which is equal in magnitude but displaced 180° in phase from the reference voltage $Er \angle 180°$. This will be apparent from Fig. 2. The voltage $Er \angle 180°$ is indicated as a negative vector along the $x$ axis. The voltage $Ex \angle \theta$ is shown as a vector which is displaced from the zero degree reference axis by the angle $\theta$. A portion of the vector $Ex \angle \theta$ is indicated as $Ex' \angle \theta$, this portion being resolved into an inphase component $Ex' \angle 0°$ and a quadrature phase component $Ex' \angle 90°$.

The voltage $Ex' \angle \theta$ is supplied to a summing amplifier 22 which also receives $Er \angle 180°$. Thus, the inphase component $Ex' \angle 0°$ of the voltage $Ex' \angle \theta$ is cancelled by the vector $Er \angle 180°$ so that the output voltage from amplifier 22 is proportional to the vector $Ex' \angle 90°$. This voltage is fed to a summing amplifier 23 whose output voltage is the error signal for the servo loop of which the amplifier 23 is a part.

Amplifier 23, motor 25, generator 30 and potentiometer 34 comprise a positional servo for the purpose of providing a shaft position at the output therefrom which is proportional to the vector $Ex' \angle 90°$. The fixed field winding 28 of motor 25 is supplied with a voltage $Em2 \angle 0°$ and the input winding 24 for the motor is connected to receive the output voltage from summing amplifier 23. Motor 25 is shaft connected to the slider of a potentiometer 34 which is excited by voltages $Ea \angle +90°$ and $Ea \angle -90°$. The output voltage on the slider is fed back as an input to amplifier 23. Motor 25 is adapted to rotate so as to position the slider of potentiometer 34 until the feedback voltage therefrom is equal and opposite to the input voltage to amplifier 23 from summing amplifier 22. For damping purposes, there is provided the generator 30 having a fixed field winding 32 which is supplied with the voltage $Em1 \angle 90°$, and an output winding 31 which is connected back to amplifier 23. The output voltage from winding 31 will be proportional to the rate of rotation of the rotor of generator 30.

Motor 27 and potentiometer 33 comprise a secondary position servo for the purpose of nulling out any components of input voltage to amplifier 23 which are ±90° out of phase with the said input voltage. As in the previous case, this prevents voltage saturation of amplifier 23 by the quadrature phase and allows better positional accuracy to be achieved in the primary position servo. This is accomplished by supplying the output of amplifier 23 to control winding 26 of motor 27. The fixed excitation winding 29 of this motor is supplied with a voltage $Em1 \angle +90°$. Since motor 27 is a two phase motor, torque will be developed and the motor will rotate only when a voltage component from the output of amplifier 23 which is 90° out of phase with the voltage $Em1 \angle +90°$ appears on the control winding. The output shaft of motor 27 is mechanically coupled to the slider of potentiometer 33 which is excited by a voltage having a phase $\angle 0°$ with respect to the reference voltage $Er \angle 0°$. The center tap of slider 33 is grounded. The voltage appearing on the slider of potentiometer 33 is supplied as the remaining input to amplifier 23. Therefore motor 25 will rotate and position the slider of potentiometer 34 until a null is reached in the primary position servo loop. Motor 27 will rotate until the quadrature phase voltage appearing in the output of amplifier 23 is nulled out. Therefore, the slider of potentiometer 33 has been positioned in accordance with the voltage $Ex' \angle \theta$, which is proportional to the angle $\theta$.

To indicate the phase angle $\theta$, a dial 35 is adapted to be mechanically connected to motor 25 and the slider of potentiometer 33 by a suitable gearing so as to be rotated by the motor with respect to a pointer 36. Dial 35 may be calibrated in such a fashion that it can be read directly in terms of degrees or phase angle displacement, i.e. the angle $\theta$.

To summarize the operation of the present invention, let it be assumed that it is desired to find the phase angle $\theta$ of an unknown voltage $Ex \angle \theta$ having a magnitude capable of varying over a relatively wide range. This voltage is supplied to the upper end of potentiometer 20. The slider of the potentiometer is controlled by the first servo loop, the voltage on the slider having a component $Ex' \angle 0°$ in phase with the 0° phase of a reference voltage $Er$. This component of the unknown voltage is equal and opposite to the voltage $Er \angle 180°$, which is supplied to amplifier 10, when the first servo loop arrives at a null.

The voltage $Ex' \angle 0°$ from the slider of the potentiometer is then compared with $Er \angle 180°$ in summing amplifier 22. With the component $Ex' \angle 0°$ cancelled out, there remains a voltage $Ex' \angle 90°$ which is proportional to the phase angle $\theta$. This voltage is supplied to a second servo loop which positions a dial 35 relative to a pointer 36. As previously mentioned, the dial may be calibrated to read directly in degrees to represent the phase angle $\theta$.

From the above, it will be seen that I have provided a phase angle measuring apparatus which is simple to construct and yet capable of excellent accuracy. The operation is very simple, it being only necessary to connect the unknown voltage to the input terminal of potentiometer 20 and the phase angle is read directly on dial 35. A further advantage of the present invention is that the device is so simple to operate that inexperienced or nontechnical personnel may use it.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. Apparatus for measuring the phase relationship between first and second alternating current voltages of equal frequency, said first voltage being variable in magnitude over relatively wide ranges and said second voltage being fixed in magnitude and phase angle, the magnitude of said first voltage being equal to or greater than said second voltage, first servo means connected to receive said first and second voltages for taking a portion of said first voltage which has a component in phase with the inphase component of said second voltage and equal in magnitude thereto, comparing means connected to receive said portion of said first voltage and a voltage equal and opposite to the inphase component of said second voltage, and second servo means connected to receive the output voltage from said comparing means for nulling to the component of said output voltage which is displaced by 90° from the inphase component of said second voltage, and indicator means connected to said second servo means to be positioned thereby.

2. Apparatus for measuring the phase relationship of an unknown alternating current voltage with respect to a reference alternating current voltage of fixed amplitude and phase, said unknown voltage having the same frequency as said reference voltage and having a magnitude equal to or greater than said reference voltage, a first servo loop including a potentiometer whose slider is positioned in accordance to the inputs of said first servo loop, said potentiometer being connected to receive said unknown voltage, one of the inputs to said first servo loop being said reference voltage and another input being the voltage on said slider, comparing means connected to the slider of said potentiometer to receive the voltage thereon and also connected to receive said reference voltage, and second servo means connected to receive the output voltage from said comparing means for nulling to the component of said output voltage which is displaced by 90° from said reference voltage, and indicator means connected to said second servo means to be positioned thereby.

3. Apparatus for measuring the phase relationship of an unknown alternating current voltage with respect to a reference alternating current voltage of fixed amplitude and phase, said unknown voltage having the same frequency as said reference voltage and having a magnitude equal to or greater than said reference voltage, a first servo loop including a potentiometer whose slider is positioned in accordance to the inputs of said first servo loop, said potentiometer being connected to receive said unknown voltage, one of the inputs to said servo loop being said reference voltage and another input being the voltage on said slider, a summing amplifier connected to receive the voltage on said slider and said reference voltage for providing an output voltage having a component displaced by 90° in phase from said reference voltage and having a magnitude which is a function of the phase angle between the unknown voltage and the reference voltage, and servo means responsive to the output to said summing amplifier for positioning a phase angle indicator.

4. Apparatus for measuring the phase relationship between first and second alternating current voltages of equal frequency, said first voltage being variable in magnitude over relatively wide ranges and said second voltage being fixed in magnitude and phase angle, the magnitude of said first voltage being equal to or greater than said second voltage, first servo means connected to receive said first and second voltages for taking a portion of said first voltage which has a component 180° out of phase with the said second voltage and equal in magnitude thereto, a summing amplifier connected to receive said portion of said first voltage and said second voltage, and second servo means connected to receive the output voltage from said summing amplifier for nulling to the component of said output voltage which is displaced by 90° from the inphase component of said second voltage, and indicator means positioned by said second servo means for indicating the magnitude of the phase relationship.

5. Apparatus for measuring the phase relationship between first and second alternating current voltages of equal frequency, said first voltage being variable in magnitude over relatively wide ranges and said second voltage being fixed in magnitude and phase angle, the magnitude of said first voltage being equal to or greater than said second voltage, means for selecting a portion of said first voltage having a magnitude equal to said second voltage but opposite in phase therewith, comparing means connected to receive the said portion of said first voltage and a component of said second voltage which is 180° out of phase therewith, and servo means connected to receive the output voltage from said comparing means for nulling to the component of said second voltage which is displaced by 90° in phase from said second voltage, and indicator means connected to said servo means to be positioned thereby.

No references cited.